Figure 1:
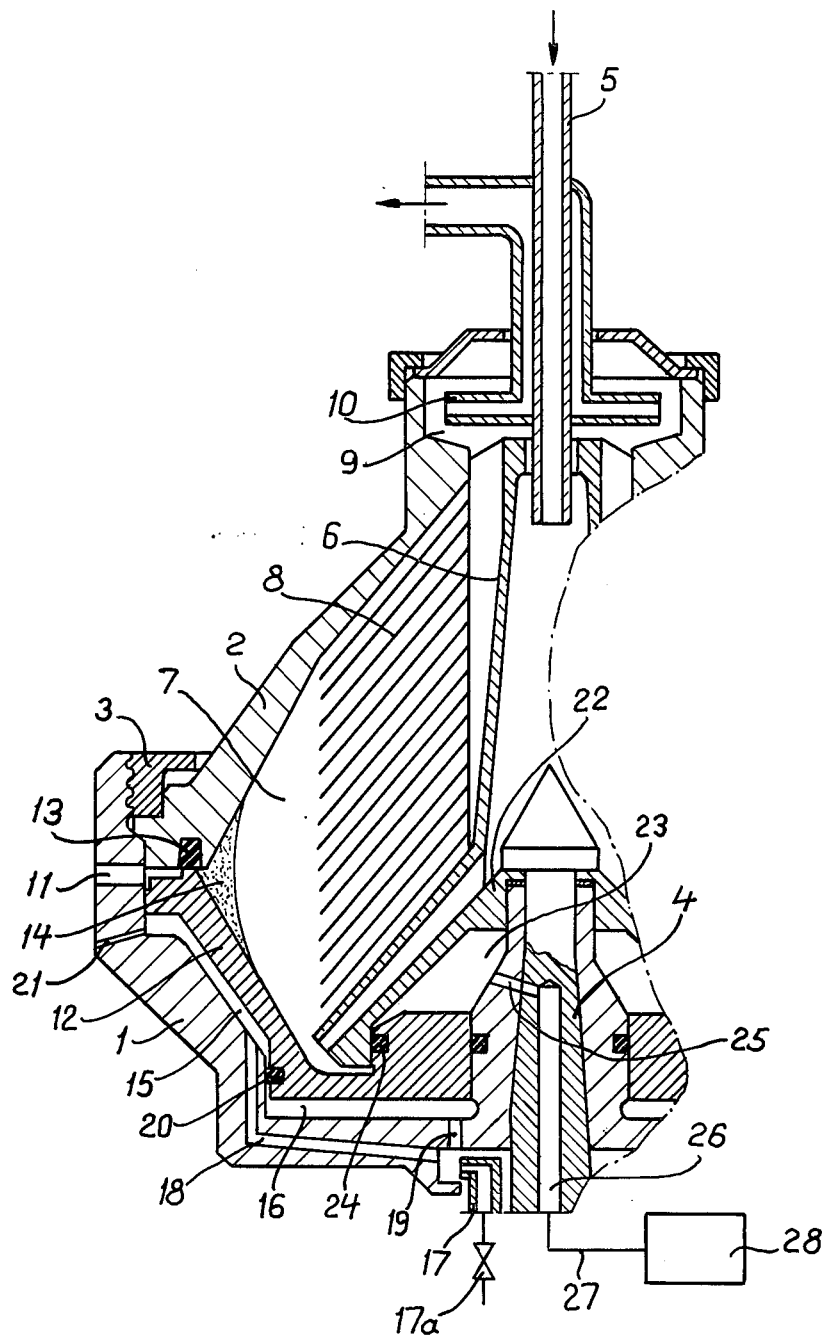

United States Patent [19]

Stroucken

[11] 4,103,822
[45] Aug. 1, 1978

[54] CENTRIFUGAL SEPARATOR

[75] Inventor: Klaus H. D. Stroucken, Ronninge, Sweden

[73] Assignee: Alfa-Laval AB, Tumba, Sweden

[21] Appl. No.: 804,074

[22] Filed: Jun. 6, 1977

[30] Foreign Application Priority Data

Jun. 11, 1976 [SE] Sweden .............................. 7606638

[51] Int. Cl.² ........................................... B04B 11/00
[52] U.S. Cl. ................................................. 233/20 A
[58] Field of Search ................ 233/20 A, 20 R, 19 R, 233/19 A

[56] References Cited

U.S. PATENT DOCUMENTS

| | | | |
|---|---|---|---|
| 2,862,659 | 12/1958 | Nyrop | 233/20 A |
| 3,754,701 | 8/1973 | Bruning | 233/20 A |
| 3,765,599 | 10/1973 | Hemfort | 233/20 A |
| 3,785,548 | 1/1974 | Stroucken | 233/20 A |
| 3,985,292 | 10/1976 | Schmidt | 233/20 A |

FOREIGN PATENT DOCUMENTS 963,524  1/1950  France ................................. 233/20 R Primary Examiner—George H. Krizmanich
Attorney, Agent, or Firm—Cyrus S. Hapgood

[57] ABSTRACT

A centrifugal rotor contains a member slidable axially of the rotor to open and close its peripheral outlets, and on the side of this member opposite from the separating chamber is an operating chamber for receiving liquid to maintain the slidable member in its closing position. Said member is moved to its opening position by draining part of the liquid from the operating chamber, the remaining liquid acting to return the slidable member to its closing position when only part of the material in the separating chamber has been discharged through the peripheral outlets. Means are provided for adjusting the magnitude of the force by which the slidable member is kept in its closing position, thereby enabling adjustment of the amount of material discharged from the separating chamber upon each opening of the peripheral outlets.

9 Claims, 2 Drawing Figures

CENTRIFUGAL SEPARATOR

The present invention relates to centrifugal separators of the kind having a rotor body forming a separating chamber with an inlet for liquid material to be centrifuged, a central outlet for a light component of the material separated within the separating chamber, and several peripheral outlets for a heavy component of the material separated in the separating chamber, the latter outlets being kept closed during a part of the operation of the centrifugal separator by means of an axially slidable member. In this kind of centrifugal separator, the axially slidable member forms a substantial part of one end wall of the separating chamber; and the side of said member turned away from the separating chamber coacts with the rotor body to form an operating chamber for liquid (so-called operating liquid) which, by its pressure during the operation of the centrifugal separator, keeps the slidable member in its position for closing the peripheral outlets. Further, first means are arranged to drain off operating liquid from said operating chamber in the operation of the centrifugal separator, so that the peripheral outlets are opened and material is thrown out from the separating chamber, while second means are arranged for retaining a certain amount of operating liquid within said operating chamber during the opening course, so that the sliding member is actuated to close the peripheral outlets when only a part of the material in the separating chamber has been thrown out through the peripheral outlets.

Centrifugal separators of this kind have long been known, in which said first and second means are formed in different ways. In one case, the first and second means cooperate with one and the same valve. A relatively new construction of a centrifugal separator is shown and described in German Patent Specification No. 2,048,429. According to this construction, the abovementioned operating chamber for operating liquid is divided into two or more separate chambers. When the peripheral outlets of the rotor body are to be opened for discharging part of the material within the separating chamber, the operating liquid is released from one of these operating chambers, while the operating liquid in at least one other operating chamber is retained, so that the sliding member will close the peripheral outlets before the separating chamber has been completely emptied. Said operating chambers may be dimensioned so that different amounts of material may be retained within the separating chamber, depending upon which of the operating chambers is drained off for the opening of the peripheral outlets.

Due to the fact that each of said operating chambers requires a separate draining valve with related operating equipment, a construction with more than two separate operating chambers of this kind is not realistic for practical use. The construction would thus be limited, in practice, to only two possible cases of operation with two different predetermined amounts of material thrown out from the separating chamber at each opening occasion. If there is a desire for throwing out a third different amount of material at each opening occasion, quite a new centrifugal separator must be made, having different dimensions of the said operating chambers.

The principal object of the present invention is to provide a centrifugal separator of substantially standard construction but having simple and inexpensive means enabling selection, according to requirements, of any desired amount of material to be thrown out through the peripheral outlets when these are opened. Depending on the kind of material to be centrifuged by a centrifugal separator of the kind described above, it may be very important, both technically and economically, to be able to choose exactly the correct amount of material to be thrown out of the separating chamber when the peripheral outlets are opened.

This object is attained, according to the invention, by providing a centrifugal separator of the initially described kind with separate means for adjusting the magnitude of the force by which the sliding member is kept in its position for closing the peripheral outlets, so that upon draining of operating liquid by actuation of said first means, an accurately predetermined force is maintained on the sliding member in the direction towards a position thereof in which it closes the peripheral outlets.

Said accurately predetermined force can be obtained in different ways according to the invention. For instance, in a centrifugal separator of the kind disclosed in the aforementioned German Patent Specification No. 2,048,429, having its chamber for operating liquid divided into two separate chambers, in the most simple case a predetermined part of the operating liquid in one of the chambers may be drained off before the whole amount of operating liquid is drained off from the second chamber. Sufficient operating liquid is thus retained in said one chamber to maintain the sliding member in its position for closing the peripheral outlets until the operating liquid in the other chamber is drained off. In practice, this may be accomplished by means for constantly supplying operating liquid to said one chamber, there being a constantly open, throttled drainage outlet from the same chamber. The drainage outlet, which may be formed by a simple bore, is then situated at a selected place so that upon interruption of the supply of operating liquid to the chamber, the latter is partly drained by the drainage outlet. The drainage outlet is thus situated so that there is maintained within the chamber a predetermined amount of operating liquid, which remains there even when the operating liquid is then drained off from the other chamber. As a consequence thereof, the sliding member is forced, by the pressure from the material within the separating chamber, to the position for opening of the peripheral outlets of the centrifuge rotor. The retained part of the operating liquid will thus exert a determined axial force on the axially slidable member, while the material is leaving the separating chamber through the opened peripheral outlets. When this determined axial force exceeds the force exerted on the sliding member in the opposite direction by material within the separating chamber (that is, when a certain amount of material has been thrown out through the peripheral outlets and only a part of the material remains within the separating chamber to exert pressure on the sliding member), the sliding member is reset to its position for closing the peripheral outlets. By arranging said drainage outlet in the correct place, the centrifugal separator will automatically throw out a desired amount of material from the separating chamber each time when the peripheral outlets are opened.

Drainage outlets of this kind can easily be arranged in a centrifugal separator previously produced, when it has been decided for which separating operation the centrifugal separator should be used. If required, a previously formed drainage outlet may easily be plugged and a new one made at a different place. According to a further simple embodiment of the invention, the above-mentioned separate means comprise a number of mechanical springs, such as coil springs, which are arranged between the sliding member and the rotor body. Depending on whether the axial force from operating liquid retained during an opening occasion is too large or too small, mechanical springs of said kind may be arranged so that they will actuate the sliding member toward either the position for closing or the position for opening the peripheral outlets of the centrifuge rotor.

Mechanical springs of the above-mentioned kind may be produced with various strength for centrifugal separators which otherwise are similar. If required, springs of this kind also may easily be exchanged.

Another object of the invention is to make it possible to change, during operation, the amount of material to be thrown out from the separating chamber each time the peripheral outlets are opened. This object is attained according to the invention by having a separate chamber defined between the sliding member and the rotor body on one side of the sliding member, means being arranged to supply this chamber with a fluid to cause an axially directed auxiliary force on the sliding member. In a preferred embodiment, means of this kind comprise a pressure fluid source, such as a source of pressurized air. The separate chamber may be charged with the pressure fluid via a central channel through the driving shaft of the rotor body. Preferably, the separate chamber is constantly filled with liquid and is also in communication with the pressure fluid source, which is arranged for setting a desired pressure during the operation of a centrifugal separator.

Because it is possible to change in the above-described manner, during the operation of the centrifugal separator, the amount of material to be thrown out each time the peripheral outlets are opened, a change of this kind may be performed with respect to certain conditions which are varying during the operation. For instance, if the dry substance content of the material being discharged through the peripheral outlets tends to change during operation, this dry substance content may be sensed by a sensing instrument arranged to influence said pressure fluid source to increase or decrease the overpressure applied, so that more or less material is discharged through the peripheral outlets each time they are opened. In this way, the dry substance content of the discharged material may automatically be kept unchanged.

Also, in another way the pressure fluid source may be connected to a control system for obtaining an optimum value of some magnitude of importance to the current separating operation.

Figure 2:
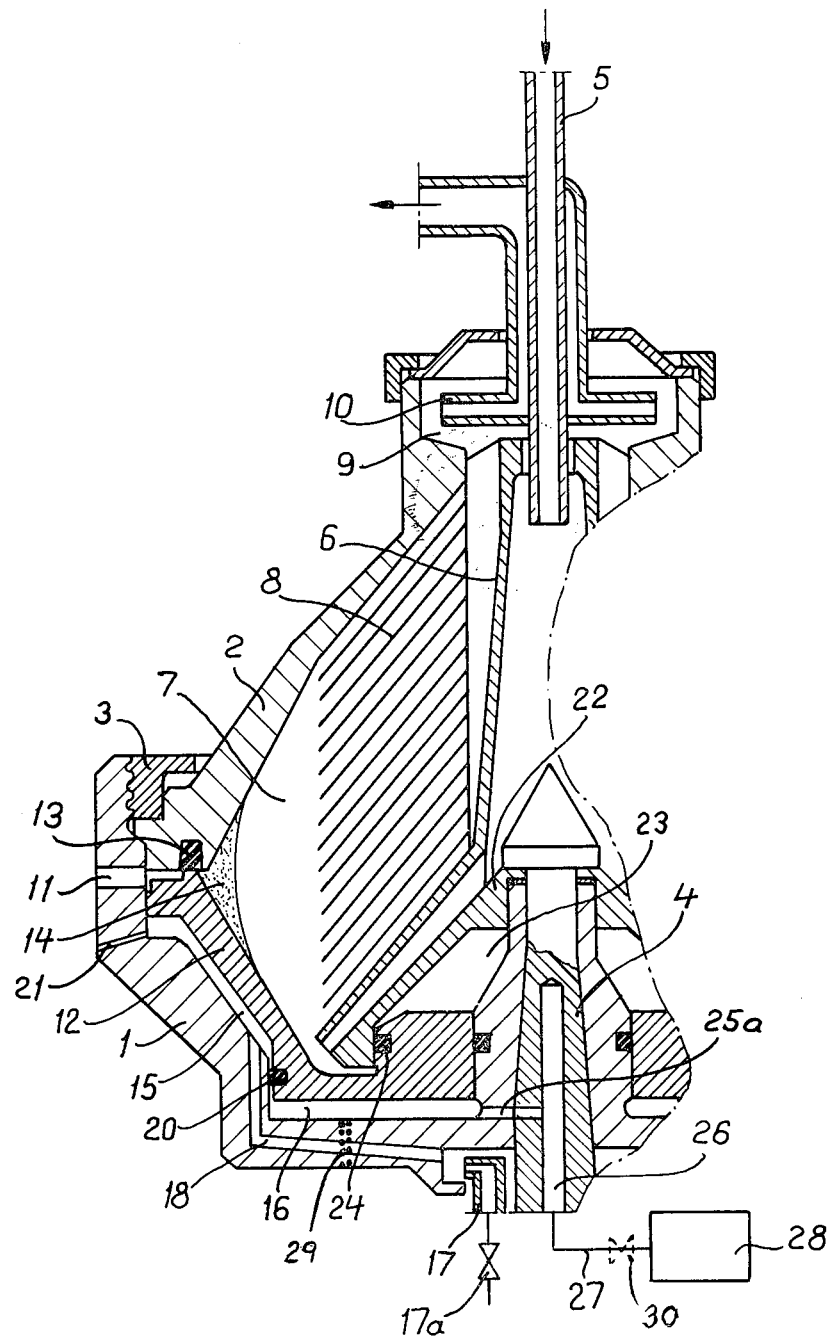

In the accompanying drawings, FIGS. 1 and 2 are vertical sectional views of centrifuges provided with different embodiments of the present invention.

In FIG. 1 there is shown a centrifuge rotor comprising a lower part 1 and an upper part 2, which parts are kept together by means of a locking ring 3. For its operation, the centrifuge rotor is connected to and supported by a vertical driving shaft 4. A stationary inlet conduit 5 opens centrally into the centrifuge rotor within a so-called distributor 6. Around the distributor 6 and within the centrifuge rotor is a separating chamber 7 containing a set of conical discs 8.

In its upper part, the centrifuge rotor has a paring chamber 9 with a stationary paring member 10 arranged therein. The paring chamber 9 communicates with the separating chamber 7 and is arranged to receive therefrom a separated light component of the material which has been supplied to the separating chamber through the inlet conduit 5.

Around its periphery, the centrifugal rotor 1-2 has several outlets 11 for a separated heavy component of the material supplied to the separating chamber 7. The outlets 11 normally are kept closed by means of a slidable member 12, which forms an end wall of the separating chamber 7 and is axially movable to and from a sealing position against an annular gasket 13 fastened to the upper rotor part 2. The outlets 11 are intended to be opened intermittently during operation of the centrifuge rotor for throwing out sludge 14, or the like, which has been separated in the separating chamber 7 during the centrifuging.

Between the slidable member 12 and the lower rotor part 1 there are formed two annular chambers 15 and 16 which, during normal operation, are filled with liquid (so-called operating liquid). Means for supplying operating liquid to the chambers 15 and 16 comprise a stationary inlet pipe 17 with a closing valve 17a, and two channels 18 and 19 formed in the rotor part 1. The operating chambers 15 and 16 are sealed from each other by means of an annular gasket 20.

The radially outer chamber 15 has a peripheral outlet for operating liquid, this outlet being shown for simplicity as a throttled channel 21. Preferably, this outlet is constituted, in practice, by several wider channels situated around the periphery of the rotor body, which channels may be kept closed by means of a separate slidable member. By means of an arrangement of the latter kind, a very rapid drainage of the chamber 15 is possible, and it is unnecessary to provide a continuous supply of operating liquid to the chamber 15 for maintaining the slidable member 12 in the position shown in the drawing.

Connected with the lower rotor part 1 is a central cap 22 cooperating with the axially slidable member 12 to define a chamber 23. A gasket 24 ensures sealing between the slidable member 12 and the cap 22 during movement of the sliding member, so that the chamber 23 is constantly kept separated from the separating chamber 7. Through a channel 25 in the rotor part 1, a central channel 26 in the driving shaft 4 and a conduit 27, the chamber 23 is connected with a pressure fluid source 28. If desired, a valve (not shown) may be arranged in the conduit 27.

In the operation of the centrifugal separator shown in FIG. 1, material to be centrifuged is supplied through the inlet conduit 5 and is separated in the separating chamber 7 into one light fraction and one heavy fraction. The light fraction leaves continuously via the paring chamber 9 through the paring member 10. The heavy fraction is collected in the radially outermost part of the separating chamber.

During centrifuging, the chambers 15 and 16 are continuously charged with operating liquid through the pipe 17 and the channels 18 and 19. Although a small amount of operating liquid continuously leaves through the outlet 21, the flow into channel 18 is sufficient to keep the chamber 15 constantly filled with operating liquid. By the liquid pressure created in the chambers 15 and 16 during the centrifuging, the sliding member 12 is kept in the position shown in FIG. 1, so that the outlets 11 remain closed. After a predetermined period of time, or when a certain amount of heavy fraction of the centrifuged material has been separated in the separating chamber, the supply of operating liquid through pipe 17 is interrupted. The chamber 15 is then drained via the outlet 21, and the sliding member 12 is thereafter urged upward in the direction towards closing of the peripheral outlets only by the pressure from the operating liquid in the chamber 16. However, this pressure is smaller than the pressure acting on the slidable member 12 in the opposite direction (downward) from the material in the separating chamber 7, so that the sliding member 12 is pressed to the position for opening of the peripheral outlets 11. Material is thus thrown out through the outlets 11. Since the chamber 16 is not drained, the force from the operating liquid therein will remain substantially unchanged during movement of the sliding member 12, whereas the force from the material in the separating chamber 7 will successively decrease as material is thrown out through the peripheral outlets 11. The liquid level in the separating chamber 7 will thus move radially outwards.

When the force from material present in the separating chamber 7 has been reduced to a value less than that of the force from the operating liquid maintained in the chamber 16, the sliding member 12 is pressed back to its position in FIG. 1 where the peripheral outlets are closed. This occurs when only a certain amount of material remains in the separating chamber 7 or in other words when a certain amount of material has left the separating chamber 7 through the peripheral outlets 11. As soon as the peripheral outlets 11 have again been closed, the supply of operating liquid through the inlet pipe 17 is resumed.

According to the present invention, it is now possible to change the amount of material that automatically leaves the separating chamber 7 when the sliding member 12 is moved to open the peripheral outlets 11. This is accomplished by means of the pressure fluid source 28, which makes it possible to subject the chamber 23 to a predetermined overpressure. An overpressure of this kind in the chamber 23 will act in the downward direction on the sliding member 12, that is, in a direction opposite to that in which the pressure from the operating liquid in chamber 16 acts on the sliding member 12. This means that when the chamber 15 has been drained, the effective force acting on the sliding member 12 to close the peripheral outlets 11 will be smaller than in the previously related case when no overpressure was provided in the chamber 23. This reduced effective closing force will not overcome the force from material present in the separating chamber 7 until more material has left the separating chamber 7 than in the first described case. In other words, by applying an overpressure in the chamber 23, it is possible to achieve an increase of the amount of material to be automatically thrown out through the peripheral outlets 11 when these are opened. The increase obviously will be in a certain proportion to the magnitude of the applied overpressure.

The fluid in the chamber 23 may be either a liquid or a gas. If desired, the chamber 23 may contain liquid, whereas the overpressure is created pneumatically from the source 28. In any case, the magnitude of the overpressure applied from source 28 may be varied by any conventional means (not shown).

In the embodiment according to FIG. 1, it is possible, as mentioned, to obtain by means of the pressure fluid source 28 an increase in the amount of material to be automatically thrown out through the peripheral outlets when they are opened. In FIG. 2 there is shown an embodiment by which said amount of material which is thrown out may be decreased instead.

With the exceptions mentioned below, the centrifuge rotor in FIG. 2 is identical to the centrifuge rotor in FIG. 1. The same reference numerals have been used in the two figures for details corresponding to each other.

Instead of the channel 25 which in FIG. 1 connects the central channel 26 of the driving shaft 4 with the chamber 23, there is in the embodiment according to FIG. 2 a channel 25a which connects the central channel 26 of the driving shaft with the chamber 16 for operating liquid. A channel corresponding to channel 19 in FIG. 1 is lacking in the embodiment according to FIG. 2. The chamber 16 in the embodiment according to FIG. 2 is thus entirely closed except for its connection with the pressure fluid source 28.

In the embodiment according to FIG. 2, the chamber 23 lacks its previously described function in connection with the embodiment according to FIG. 1. The chamber 23, if desired, may be filled with either gas or liquid.

As long as no overpressure is applied by means of the pressure fluid source 28, but the chamber 16 contains liquid, the centrifuge rotor according to FIG. 2 operates in the same manner as the centrifuge rotor according to FIG. 1 before overpressure has been applied. This operation has been described above.

When in FIG. 2 an overpressure is applied on the operating liquid in the chamber 16 by the pressure fluid source 28, this means an increase of the axial force exerted by this operating liquid on the sliding member 12. This larger axial force will act on the sliding member 12 even when the supply of operating liquid through the pipe 17 is interrupted so that the chamber 15 is drained. When the chamber 15 is drained, the sliding member 12 is pressed to its position for opening of the peripheral outlets 11, due to the pressure from the material in the separating chamber 7, material being thrown out through the peripheral outlets. When a relatively small amount of material has left the separating chamber in this way, and consequently the force exerted on the sliding member 12 from material remaining in the separating chamber has been reduced a relatively small amount, the force from the operating liquid in the chamber 16 will press the sliding member 12 back to its position for closing the peripheral outlets 11. The larger the force from the operating liquid, that is, the larger the overpressure applied by means of the pressure fluid source 28, the smaller the amount of material which will be allowed to leave the separating chamber 7 before the sliding member 12 is pressed back to close the peripheral outlets 11.

In FIG. 2 there is shown by dashed lines 29 and 30 a further possible embodiment according to the invention. The dashed lines 29 indicate a throttled drainage outlet from the chamber 16, while the lines 30 indicate a closing valve in the conduit 27. In this case, the source 28 is arranged for continuous supply of liquid to the chamber 16, so that this can be kept filled during operation, in spite of constant leakage of liquid through the drainage outlet 29. The valve 30 is arranged for occasional interruptions of the liquid supply to the chamber 16 immediately before the peripheral outlets 11 of the rotor body are to be opened.

The location of the drainage outlet 29 is carefully determined so that when the liquid supply through conduit 27 is interrupted, the chamber 16 is emptied of a predetermined part of its content. The axial force by which the sliding member 12 keeps the peripheral outlets 11 closed will thus be adjusted. Consequently, when the chamber 15 is thereafter completely emptied of liquid and the sliding member 12 is thus pressed downwardly, the sliding member 12 will be influenced to reclose the peripheral outlets 11 only by the force exerted by the liquid remaining in the chamber 16. The amount of this remaining liquid, or in fact the position of the drainage outlet 29, will thus determine how much material will be retained in the separating chamber 7 when the sliding member 12 again closes the peripheral outlets 11. In other words, the position of the drainage outlet 29 will determine the amount of material which will automatically leave the separating chamber 7 when the peripheral outlets 11 are occasionally opened.

In the same way as the embodiment according to FIG. 2 has been modified by addition of the drainage outlet 29 and the closing valve 30, the embodiment according to FIG. 1 may be modified. Consequently, in the embodiment according to FIG. 1, there may be arranged in the corresponding manner a drainage outlet in connection with the chamber 23, so that the latter may be emptied partly of liquid immediately before the peripheral outlets 11 are to be opened. A closing valve corresponding to the valve 30 in FIG. 2 must then be arranged in the conduit 27 in FIG. 1.

As mentioned previously, the drawings show, for the sake of simplicity, only one constantly open throttled drainage outlet 21 from the chamber 15. In practice, there is generally a hydraulically or otherwise operable valve means for closing a substantially wider drainage outlet. In this way, a very rapid drainage of the chamber 15 (and also a correspondingly rapid opening of the peripheral outlets 11) may be obtained. In practice, it is also intended that the chamber 16 shall be provided with a strongly throttled drainage outlet so that, if desired, the separating chamber 7 can be entirely emptied of material. This drainage outlet (not shown) must be throttled so that no substantial part of the liquid in the chamber 16 will leave it through the drainage outlet while the chamber 15 is being drained. Also, in the embodiments according to FIGS. 1 and 2, drainage outlets of this kind may be arranged for the respective chambers 16, but these drainage outlets in that case must be more throttled than the drainage outlets 21 from the respective chambers 15. In an embodiment of the kind comprising a drainage outlet 29 (FIG. 2), this drainage outlet must be larger than any further drainage outlet for total emptying of the chamber 16.

In the embodiments according to FIGS. 1 and 2, the respective chambers 16, for the sake of simplicity, have been shown having exactly the same radial extension. Depending upon which of these embodiments is chosen in practice, the chamber 16 is given an optimum dimension with regard to the overpressure from the pressure fluid source 28 required in various connections.

It will be understood that the parts 17a and 21 form means for draining off liquid from the operating chamber 15-16 during operation of the separator, and the annular gasket 20 forms means for retaining a predetermined amount of operating liquid in chamber 15-16 upon draining thereof. The parts 22-28 in FIG. 1 and the parts 25a-30 in FIG. 2 form means for adjusting the magnitude of the force by which sliding member 12 is kept in its position for closing the peripheral outlets. In FIG. 1, chamber 23 may be termed a control chamber; and in FIG. 2, chamber 16 may be termed a control chamber. In FIG. 2, the parts 29 and 30 form means for charging control chamber 16 with a liquid and for partially emptying chamber 16 immediately before opening of the peripheral outlets 11.

I claim:

1. A centrifugal separator comprising a rotor mounted for rotation about an axis and having a separating chamber with an inlet for material to be centrifuged, the rotor also having a central outlet for a light component of the material separated in said chamber and having peripheral outlets for a heavy component of the material separated in said chamber, a member slidable axially in the rotor body to open and close said peripheral outlets and forming a substantial part of one end wall of the separating chamber, the side of said member turned away from the separating chamber coacting with the rotor to form an operating chamber for receiving operating liquid which, by its pressure during operation of the separator, keeps the slidable member in position to close said peripheral outlets, means for supplying liquid to the operating chamber, means for draining off operating liquid from said operating chamber during operation of the separator, whereby the slidable member is actuated to open the peripheral outlets and thereby discharge material from the separating chamber, means for retaining a predetermined amount of liquid in the operating chamber upon draining thereof, whereby the slidable member is actuated to close the peripheral outlets when only part of the material in the separating chamber has been discharged through said outlets, and means independent of said liquid supplying means and said liquid draining means for adjusting the magnitude of the force by which the sliding member is kept in its position for closing the peripheral outlets, so that upon draining of operating liquid by actuation of said draining means, an accurately predetermined force is maintained acting on the sliding member in the direction toward its position for closing the peripheral outlets.

2. The separator of claim 1, in which a separate control chamber is formed between the slidable member and the rotor on one side of said member, said adjusting means including separate means for supplying a fluid to said control chamber to create an axially directed auxiliary force on the slidable member.

3. The separator of claim 2, in which said separate supply means include a pressure fluid source.

4. The separator of claim 2, in which said separate supply means include a pressurized air source.

5. The separator of claim 2, comprising also a liquid in said control chamber, said separate supply means being operable to supply a fluid to the liquid in the control chamber.

6. The separator of claim 2, in which said adjusting means also include means for changing the pressure of said supplied fluid during operation of the separator.

7. The separator of claim 1, in which a separate control chamber is formed between the slidable member and the rotor on one side of said member, said adjusting means including separate means for charging said control chamber with a liquid and for partially emptying the control chamber immediately before opening of said peripheral outlets.

8. The separator of claim 7, in which said control chamber is constituted by part of said operating chamber.

9. The separator of claim 1, in which said adjusting means include fluid supply means separate from said liquid supplying means.

* * * * *